(12) United States Patent
Borrelli et al.

(10) Patent No.: US 8,179,595 B2
(45) Date of Patent: May 15, 2012

(54) POLARIZING PHOTOREFRACTIVE GLASS

(75) Inventors: Nicholas Francis Borrelli, Elmira, NY (US); Joseph Francis Schroeder, III, Corning, NY (US); Thomas P. Seward, III, Elmira, NY (US)

(73) Assignee: Corning Incorporated, Corning, NY (US)

( * ) Notice: Subject to any disclaimer, the term of this patent is extended or adjusted under 35 U.S.C. 154(b) by 480 days.

(21) Appl. No.: 12/355,004

(22) Filed: Jan. 16, 2009

(65) Prior Publication Data
US 2009/0190216 A1 Jul. 30, 2009

Related U.S. Application Data

(63) Continuation-in-part of application No. 12/011,736, filed on Jan. 29, 2008, now abandoned, and a continuation-in-part of application No. 12/337,920, filed on Dec. 18, 2008.

(51) Int. Cl.
*G02B 5/20* (2006.01)
(52) U.S. Cl. ............... 359/361; 359/485.01; 359/487.01; 359/488.01; 359/489.01; 359/489.06; 501/66
(58) Field of Classification Search .................. 359/361, 359/485.07, 558, 577, 615, 620, 642, 885, 359/900, 485.01–485.05, 486.01, 487.01, 359/487.02, 488.01, 489.01, 489.06; 501/2–4, 501/27, 30, 37, 55, 56, 65, 66, 905
See application file for complete search history.

(56) References Cited

U.S. PATENT DOCUMENTS

| 2,319,816 | A |   | 10/1939 | Land et al. |
| 3,540,793 | A |   | 11/1970 | Araujo et al. ................. 350/147 |
| 3,653,863 | A |   | 4/1972 | Araujo et al. .................... 65/30 |
| 3,978,272 | A | * | 8/1976 | Donley ......................... 428/434 |
| 4,017,316 | A |   | 4/1977 | Renkey et al. .................. 106/15 |
| 4,057,408 | A |   | 11/1977 | Pierson et al. .................... 65/18 |
| 4,125,404 | A |   | 11/1978 | Araujo et al. .................. 106/54 |
| 4,125,405 | A |   | 11/1978 | Araujo et al. .................. 106/54 |
| 4,188,214 | A |   | 2/1980 | Kido et al. .................... 430/494 |
| 4,282,022 | A |   | 8/1981 | Lo et al. ........................ 65/85 |
| 4,304,584 | A |   | 12/1981 | Borrelli et al. ............... 65/30.11 |
| 4,479,819 | A |   | 10/1984 | Borelli et al. ................ 65/30.11 |
| 4,792,535 | A |   | 12/1988 | Fine ............................... 501/66 |
| 4,891,336 | A |   | 1/1990 | Prassas |

(Continued)

FOREIGN PATENT DOCUMENTS
EP 0518019 12/1992

*Primary Examiner* — Frank Font
(74) *Attorney, Agent, or Firm* — Walter M. Douglas

(57) ABSTRACT

The invention is directed to a glass composition and articles made from the composition that are both polarizing and photorefractive. The glass has, for example, a composition consisting essentially of, in weight percent ("wt. %") of 70-73 $SiO_2$, 13-17% $B_2O_3$, 8-10% $Na_2O$, 2-4% $Al_2O_3$, 0.005-0.1% CuO, <0.4% Cl, 0.1-0.5% Ag, 0.1-0.3% Br. In another embodiment the composition consists essentially of 70-77% $SiO_2$, 13-18% $B_2O_3$, 8-10% $Na_2O$, 2-4% $Al_2O_3$, 0.005-0.1% CuO, <0.4% Cl, 0.1-0.5% Ag, 0.1-0.3% Br. The glass can be used make articles or elements that can exhibits both the photorefractive effect and the polarizing effect within a single element or article, and can be used to make a variety of optical elements including Bragg gratings, filtering elements, and beam shaping elements and light collection elements for use in display, security, defense, metrology, imaging and communications applications.

16 Claims, 5 Drawing Sheets

U.S. PATENT DOCUMENTS

| | | | |
|---|---|---|---|
| 4,908,054 A | 3/1990 | Jones et al. | |
| 4,979,975 A | 12/1990 | Borrelli et al. | 65/30.11 |
| 5,045,509 A | 9/1991 | Kiefer | 501/59 |
| 5,115,336 A * | 5/1992 | Schildkraut et al. | 359/263 |
| 5,184,323 A * | 2/1993 | Schildkraut et al. | 365/124 |
| 5,275,979 A | 1/1994 | Borrelli et al. | 501/13 |
| 5,281,562 A | 1/1994 | Araujo et al. | 501/32 |
| 5,300,465 A | 4/1994 | Grateau et al. | 501/13 |
| 5,322,819 A | 6/1994 | Araujo et al. | |
| 5,332,819 A | 7/1994 | Smothers | 546/94 |
| 5,375,012 A * | 12/1994 | Borrelli et al. | 359/486.03 |
| 5,396,368 A * | 3/1995 | Khoshnevisan et al. | 359/885 |
| 5,430,573 A | 7/1995 | Araujo et al. | 359/361 |
| 5,517,356 A | 5/1996 | Araujo et al. | 359/490 |
| 5,586,141 A | 12/1996 | Ashdown et al. | 375/202 |
| 5,625,427 A | 4/1997 | Araujo et al. | 351/159 |
| 5,627,114 A | 5/1997 | Havens et al. | 501/56 |
| 5,729,381 A | 3/1998 | Havens et al. | 359/361 |
| 6,151,429 A * | 11/2000 | Kristensen et al. | 385/11 |
| 6,298,691 B1 | 10/2001 | Borrelli et al. | 65/30.1 |
| 6,313,947 B1 | 11/2001 | Takahashi et al. | 359/492 |
| 6,466,297 B1 | 10/2002 | Goulding et al. | 349/175 |
| 6,536,236 B2 | 3/2003 | Grossman et al. | 65/30.11 |
| 6,563,639 B1 * | 5/2003 | Borrelli et al. | 359/484.03 |
| 6,596,201 B1 * | 7/2003 | Borrelli et al. | 252/585 |
| 6,673,497 B2 | 1/2004 | Efimov et al. | 430/1 |
| 6,754,002 B2 * | 6/2004 | Borrelli et al. | 359/355 |
| 6,775,062 B2 | 8/2004 | Borrelli et al. | 359/492 |
| 7,319,550 B2 * | 1/2008 | Hayashi et al. | 359/29 |
| 7,388,100 B2 * | 6/2008 | Nishio | 548/469 |
| 7,477,433 B2 * | 1/2009 | Yasuda et al. | 359/10 |
| 2003/0049551 A1 * | 3/2003 | Parikh et al. | 430/58.65 |
| 2003/0064875 A1 * | 4/2003 | Yamashita et al. | 501/32 |
| 2004/0013972 A1 | 1/2004 | Nishimura et al. | |
| 2005/0083535 A1 * | 4/2005 | Kamshilin et al. | 356/502 |
| 2005/0128588 A1 | 6/2005 | Borrelli et al. | 359/492 |
| 2005/0181926 A1 * | 8/2005 | Fechner et al. | 501/70 |
| 2006/0142413 A1 * | 6/2006 | Zimmer et al. | 523/122 |
| 2006/0252628 A1 * | 11/2006 | Ichimura et al. | 501/3 |
| 2007/0054795 A1 * | 3/2007 | Wolff et al. | 501/66 |
| 2007/0141350 A1 | 6/2007 | Borrelli et al. | |
| 2008/0130171 A1 * | 6/2008 | Behan et al. | 360/131 |
| 2008/0289427 A1 * | 11/2008 | Brandt et al. | 73/643 |

* cited by examiner

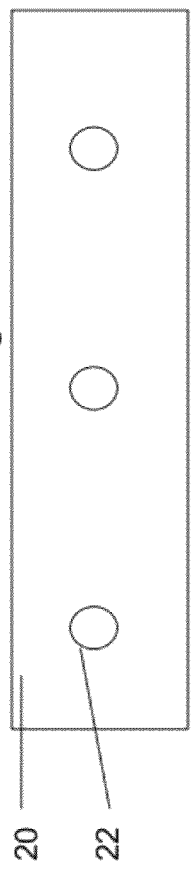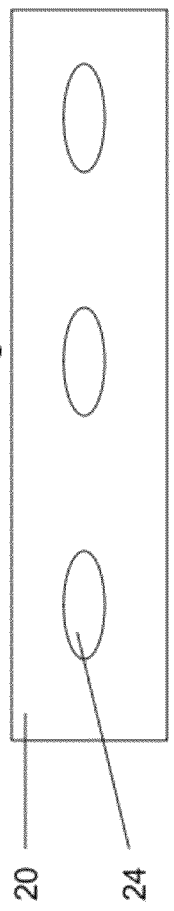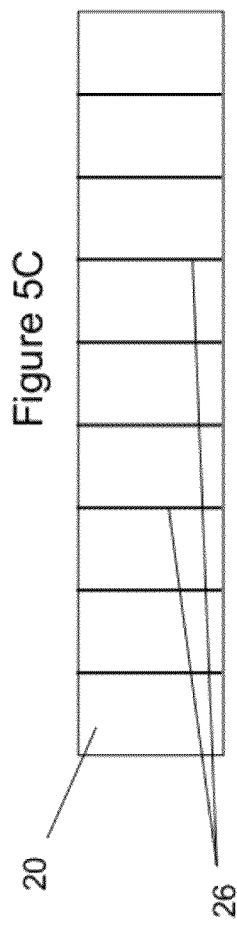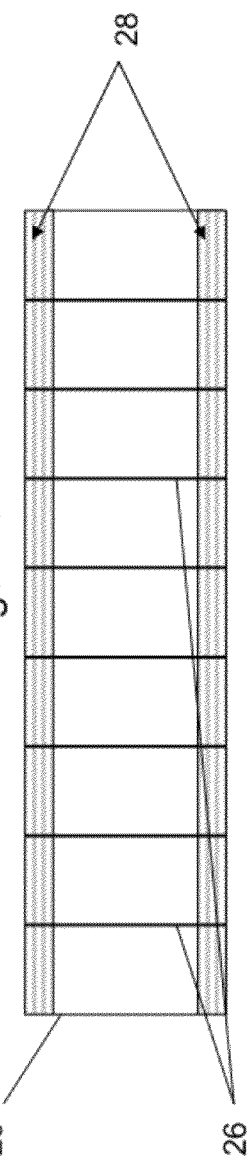

POLARIZING PHOTOREFRACTIVE GLASS

PRIORITY

This application is a continuation-in-part application claiming the priority of U.S. application Ser. No. 12/011,736 filed Jan. 29, 2008 now abandoned in the name of inventors Nicholas F. Borelli and Joseph F. Schroeder III, and U.S. application Ser. No. 12/337,920 filed Dec. 18, 2008 in the name of inventors Nicholas F. Borelli, Joseph F. Schroeder III, and Thomas P. Seward III. The present application, U.S. Ser. No. 12/011,736 and U.S. Ser. No. 12/337,920 are commonly assigned to Corning Incorporated.

FIELD

The invention is directed to a glass composition and articles made from the composition that are both polarizing and photorefractive. In particular, the glass composition of the invention enables one to make glass articles that have a fully integrated polarizing and diffractive characteristics in the same glass element.

BACKGROUND

The photorefractive effect, as the term is used herein, is defined to mean that there is an induced refractive index change produced by light followed by a thermal treatment. This is also often called the "photothermal effect" to distinguish it from the classical photorefractive effect which involves light-induced charge redistribution in a nonlinear optical material to produce internal electric fields which, by virtue of the optical nonlinearity, produce local changes in the index of refraction.

Diffractive elements find use in a wide variety of fields. For example, diffractive optical elements are useful for filtering, beam shaping and light collection in display, security, defense, metrology, imaging and telecommunications applications.

One especially useful diffractive optical element is a Bragg grating. A Bragg grating is formed by a periodic modulation of refractive index in a transparent material. Useful utilizations of the this effect are Bragg gratings that reflect wavelengths of light that satisfy the Bragg phase matching condition, and transmit all other wavelengths. Bragg gratings are especially useful in telecommunications applications; for example, they have been used as selectively reflecting filters in multiplexing/demultiplexing applications; and as wavelength-dependent pulse delay devices in dispersion compensating applications.

Bragg gratings are generally fabricated by exposing a photosensitive (photorefractive) material to a pattern of radiation having a periodic intensity. Many photosensitive materials have been used; however, few have provided the desired combination of performance and cost. For example, Bragg gratings have been recorded in germanium-doped silica glass optical fibers, and while such gratings are relatively robust, the fiber geometry and high melting point of the material make these gratings inappropriate for many optical systems. Bragg gratings have also been recorded in photorefractive crystals such as iron-doped lithium niobate. These filters had narrow-band filtering performance, but suffered from low thermal stability, opacity in the UV region, and sensitivity to visible radiation after recording.

Ordinary unpolarized light is made up of many waves that have their electric and magnetic fields randomly oriented, although orthogonal to each other for each wave. If all the electric fields, and consequently also all the magnetic fields, were aligned parallel to one another the light would be linearly polarized. Normal light is considered to be a combination of the two polarizations, vertical and horizontal which is determined by the direction of the electric field. Stated another way, all light is an electromagnetic wave which means that it a wave with an electric field oscillating up and down in one plane, and a magnetic field oscillating up and down in a plane perpendicular to the electric field. The line where those planes cross is the axis along which the wave propagates. A polarizer is anything that allows only light with its electric field in a certain orientation to pass through it.

The use of polarizers is important in telecommunications using optical fibers, particularly single mode optical fibers. Single mode fibers can actually carry the modes with orthogonal orientation. Fibers with circularly symmetric cores cannot differentiate between the two linear polarizations; that is they are degenerate because they are functionally equivalent and cannot be told apart. If the circular symmetry of optical fibers were perfect polarizations would have little impact on telecommunications. However, since fiber symmetry is not perfect the two polarization modes may experience different conditions and travel along the fiber at different speeds. This results in what is called "polarization mode dispersion" which can cause problems in high performance systems. Consequently, it is desirable that only light of having a single polarization be transmitted through optical fibers.

Glass polarizers, the material compositions and the methods for making the glasses and articles made from the glasses have been described in numerous United States patents. Products and compositions are described in U.S. Pat. Nos. 6,563,639, 6,466,297, 6,775,062, 5,729,381, 5,627,114, 5,625,427, 5,517,356, 5,430,573, 4,125,404 and 2,319,816, and in U.S. Patent Application Publication No. 2005/0128588. Methods for making polarizing glass compositions and or compositions containing silver, and/or articles made from polarizing or silver-containing glasses have been described in U.S. Pat. Nos. 6,536,236, 6,298,691, 4,479,819, 4,304,584, 4,282,022, 4,125,405, 4,188,214, 4,057,408, 4,017,316, and 3,653,863. Glass articles that are polarizing at infrared wavelengths have been described in U.S. Pat. Nos. 5,430,573, 5,332,819, 5,300, 465, 5,281,562, 5,275,979, 5,045,509, 4,792,535, and 4,479, 819; and in additional patents or publications U.S. Pat. No. 6,313,947 and EP 0 719 741. The European patent publication describes a copper-based polarizing glass instead of a silver-based polarizing glass. Additional U.S. patents describing glass optical polarizers and methods of preparing them have been described in, U.S. Pat. No. 3,540,793 (Araujo et al.), and U.S. Pat. Nos. 4,304,584 and 4,479,819 (both to Borrelli et al.).

Photosensitive/photorefractive glasses based on the $Ce^{3+}$/$Ag^+$ redox couple have been proposed as substrates for the formation of diffractive optical elements. For example, U.S. Pat. No. 4,979,975 (Borrelli) discloses a photosensitive glass containing, in weight percent on the oxide basis, about 14-18% $Na_2O$, 0-6% $ZnO$, 6-12% $Al_2O_3$, 0-5% $B_2O_3$, 65-72% $SiO_2$ and 0-0.2% $Sb_2O_3$, 0.007-0.04% Ag and 0.008-0.005% $CeO_2$, 0.7-1.25% Br and 1.5-2.5% F. In these materials, exposure to radiation ($\lambda$~366 nm) causes a photoreduction of $Ag^+$ to colloidal $Ag^0$, and $Ce^{3+}$ to $Ce^{4+}$ which acts as a nucleus for crystallization of a NaF phase in a subsequent heat treatment step. These glasses had a very high absorbance at wavelengths less than 300 nm, making them unsuitable for use with commonly used 248 nm excimer laser exposure systems.

More recently, Elfimov etc. al. in U.S. Pat. Nos. 6,673,497 and 5,586,141 describe a NaF-based photosensitive glass that by the appropriate exposure and thermal development produces a refractive index change in the near infrared that accompanied the development of the NaF phase. The glass composition falls within that composition described in the Borrelli reference cited in the paragraph above. This effect opened the possibilities for applications to optical devices based upon a photorefractive effect, with examples including Bragg gratings and holographic elements. The specific composition disclosed by Glebov et al was very similar to that Borrelli et al. As disclosed above, the important constituents in the glasses are the concentrations of Ce+3 (photosensitizer), Ag+ (photonucleus), and F, with the latter controlling the amount of NaF that can be produced and consequently the maximum amount of possible induced refractive index change. In order to achieve the photosensitive/photorefractive effect in the glass, Glebov's process, like the above described Borrelli reference, involved the exposure to light in the vicinity of 300 nm, or greater, followed by a heat treatment of 520° C. for 2 hours.

While the above patents describe glasses that are either polarizing or photorefractive/photosensitive, none describes a glass that is both polarizing and photorefractive/photosensitive. At the present time, in order to both diffract light and polarize light two separate elements are required. That is, one must use both a diffraction grating element and a polarizer element. The present invention is fulfills the need for a glass composition that can be used to make articles or elements that can perform or exhibit both the photorefractive effect and the polarizing effect within a single element or article.

SUMMARY

The invention, in all embodiments described herein, is directed to silver halide containing glass compositions that can be used to make articles or elements that are both photorefractive and polarizing articles (that is, to "photorefractive, polarizing glass compositions"); photorefractive, polarizing articles or elements made from the glass; and a method of making the photorefractive, polarizing glass and the photorefractive, polarizing articles. In one embodiment the invention is directed to a glass with a composition consisting essentially of, in weight percent ("wt. %"), 70-73% $SiO_2$, 13-18% $B_2O_3$, 8-10% $Na_2O$, 2-4% $Al_2O_3$, 0.005-0.1% CuO, <0.4% Cl, 0.1-0.5% Ag, 0.1-0.3% Br; and further to an integrated photorefractive, polarizing article or element made from the glass composition. In another embodiment the glass with a composition consists essentially of, in weight percent ("wt. %"), 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, 0.1-0.3% Br.

In an addition embodiment the invention is directed to a photorefractive, polarizing glass composition consisting essentially of 71.1±0.5% $SiO_2$, 14.7±0.5% $B_2O_3$, 9.3±0.5% $Na_2O$, 3±0.5% $Al_2O_3$, 0.005±0.1% CuO, <0.4% Cl, 0.33±0.05% Ag, 0.1-0.3% Br; and further to an integrated photorefractive, polarizing article or element made from the glass composition.

In an additional embodiment the invention is directed to a glass with a composition consisting essentially of, in weight percent ("wt. %"), 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, >0.0-<0.03 alkaline earth metal oxide (selected from the group consisting of CaO, BaO, SrO and Mg, and mixtures thereof) and 0.1-0.3% Br; and further to an integrated photorefractive, polarizing article or element made from the glass composition. In some embodiments the alkaline earth metal oxide is CaO.

In another embodiment the invention is directed to a glass with a composition consisting essentially of, in weight percent ("wt. %"), 71±1% $SiO_2$, 15.5-17.5% $B_2O_3$, 7-9% $Na_2O$, 3±0.5% $Al_2O_3$, 0.01±0.005% CuO, <0.4% Cl, 0.33±0.05% Ag, >0-<0.3 CaO and 0.1-0.3% Br; and further to an integrated photorefractive, polarizing article or element made from the glass composition.

In another embodiment the glass composition consists essentially of, in weight percent ("wt. %"), 71.7±0.5% $SiO_2$, 15.8-17.2% $B_2O_3$, 7.2-8.5% $Na_2O$, 3±0.5% $Al_2O_3$, 0.01±0.005% CuO, <0.4% Cl, 0.33±0.05% Ag, >0.0-<0.03% CaO (or other alkaline earth metal oxide such as MgO, BaO and SrO), and 0.1-0.3% Br, and further to an integrated photorefractive, polarizing article or element made from the glass composition.

In all embodiments of the invention the compositions have an "R value" in the range of 0.3-0.65, preferably in the range of 0.35 to 0.60. In all embodiments of the invention the compositions contain at least one halogen selected from the group consisting of chlorine and bromine.

The invention is also directed to a polarizing glass optical elements or articles in which the refractive index of the glass can be changed by subjecting the glass or selected portion of the glass to ultraviolet radiation ("UV") in the wavelength range of 150-400 nm. In one particular embodiment the invention is directed to a polarizing diffraction grating. The optical elements or articles contain at least one polarizing layer.

In another embodiment the invention is directed to glass articles or elements that are both photorefractive and polarizing in the same piece of glass; that is, articles or elements that have integrated photorefractive and polarizing characteristics and are made of a single glass composition. A glass of this type can be used to make an article or element that is a fully integrated light polarizer and diffractive element. Examples of the type of articles or elements that can be made using the glass of the invention include, without limitation, Bragg grating, filtering articles, and beam shaping and light collection articles for use in display, security, defense, metrology, imaging and communications applications.

The invention is also directed to an optical element that is both photorefractive and polarizing comprising of a silver halide containing glass and a refractive index pattern formed in the silver halide containing glass material, the refractive index pattern including regions of high refractive index and regions of low refractive index; and the glass being both photorefractive and polarizing. The terms "regions of high refractive index" and "regions of low refractive index" mean that within the glass there are regions that have measurably different refractive indices as a result of the "photorefractive exposure" and subsequent second heat treatment as explained herein.

The invention is further directed to a method for producing a photorefractive, polarizing glass element or article, the method comprising the steps of:

providing a silver halide containing glass composition capable of having both photorefractive and polarizing properties (properties are not developed until after the processing is completed);

forming the glass composition into a shape suitable for redrawing;

subjecting the shaped glass to a first heat treatment at a temperature in the range of 575-725° C. for a time in the range 1-4 hours to form silver halide particles in the glass;

redrawing the glass at a draw temperature that allows a glass viscosity greater than $10^6$ poise and a pulling velocity sufficient to apply a force greater than 3500 psi to elongate the silver particles;

conducting a photorefractive exposure on the glass by exposing the redrawn glass to UV radiation in the range of 190-360 nm for a time in the range of 1 minute to 7 hours;

subjecting the photorefractively exposed glass to a second heat treatment at a temperature in the range of 400-500° C. for a time in the range of 1-4 hours; and conducting a hydrogen reduction of the glass at a temperature in the range of 390-430° C. for a time in the range of 1-6 hours to thereby form a glass article that is a polarizing, photorefractive glass element or article, said article having at least one polarizing glass layer. In one embodiment the second heat treatment is carried out at a temperature in the range of 450-500° C. for a time in the range of 1-4 hours. The thickness of the at least one polarizing layer is 40 µm or less. The thickness of the polarizing layer can be increased by increasing the reduction time, the hydrogen pressure, or both.

BRIEF DESCRIPTION OF THE DRAWINGS

FIGS. 5A to 5D are diagrams illustrating the steps used in the process of making a polarizing refractive article according to the invention.

DETAILED DESCRIPTION

Figure 1:
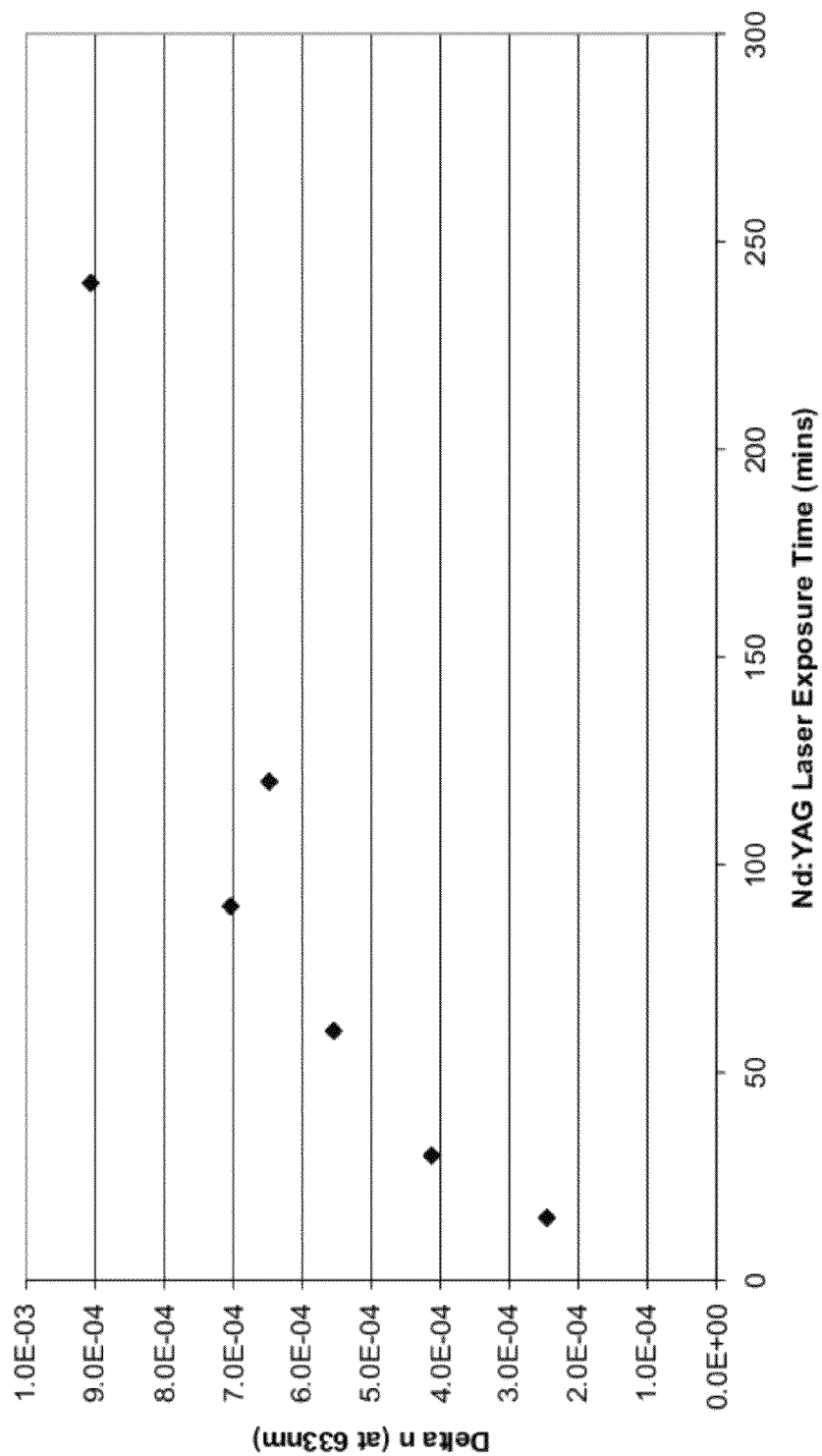
FIG. 1 illustrates the change in refractive index ("n") of a glass composition of the invention as a function of exposure time to an Nd:YAG laser.
Figure 2:
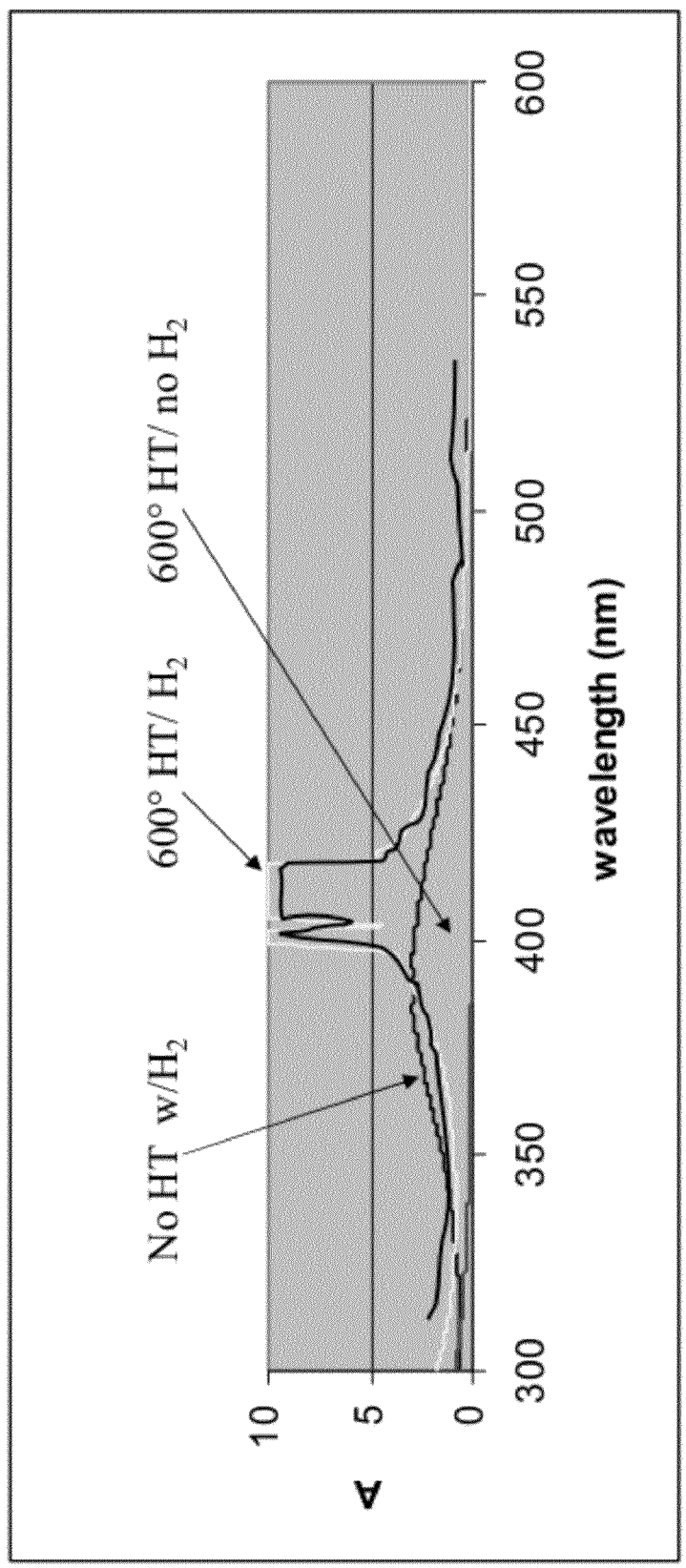
FIG. 2 illustrates the absorption of a glass of the invention before and after $H_2$ reduction and heat treatment at 575° C.

The invention is directed to a glass composition that can be used to make glass articles that are both polarizing and photorefractive, and further to glass optical elements or articles that exhibit both polarizing properties and also a refractive index change in response to exposure to ultraviolet radiation followed by a thermal treatment. The glass composition of the invention thus enables one to make glass articles or elements that have fully integrated polarizing and diffractive characteristics in the same glass element. As used herein the term "photorefractive effect", "photorefractive glass" or "polarizing, photorefractive glass" means that there is an induced refractive index change in the glass that produced by subjecting the glass to ultraviolet light followed by a thermal treatment. This is also often called the "photothermal effect" to distinguish it from the classical photorefractive effect. All percentages given herein are in weight percent ("wt. %"). The transitional phrase "consisting essentially of" limits the scope of a claim to the specified materials or steps "and those that do not materially affect the basic and novel characteristic(s)" of the claimed invention. That is, as used herein the transitional phrase "consisting essentially of" means that the glass compositions or methods recited herein contain the specified elements, steps or ingredients as indicated and excludes additional elements, steps or ingredients which would materially affect the basic and novel characteristics of the glass, which are that the glass of the compositions of the invention can be made into a single article that is both photorefractive and polarizing. As also used herein, the terms "polarizing, photorefractive glass composition," "photorefractive, polarizing glass composition," and similar terms means that the glass can be used to form an article that is both polarizing and photorefractive after processing as described herein.

As described in the art, the polarizing effect is generated in aluminoborosilicate glasses containing silver, copper or copper-cadmium crystals by stretching the glass and then exposing the stretched glass to a reducing atmosphere, typically a hydrogen containing atmosphere. The glass is placed under stress at a temperature above the glass annealing temperature. This elongates the glass, and thereby elongates and orients the crystals. The shear stress that acts on the particles is proportional to the viscosity of the glass and the draw speed during elongation. The restoring force that opposes the deformation by the shear force is inversely proportional to the particle radius. Hence, the optimum conditions for producing a desired degree of particle elongation and a resulting polarizing effect at a given wavelength involves a complex balance of a number of properties of the glass and the redrawing process. Once the glass has been elongated, the elongated glass article is then exposed to a reducing atmosphere at a temperature above 120° C., but not higher than 25° C. above the annealing point of the glass. This develops a surface layer in which at least a portion of metal halide crystals present in the glass are reduced to elemental silver or copper.

The production of polarizing glass is described in numerous patent references and broadly involves the following four steps:

Melting a glass batch containing a source of silver and a halogen other than fluorine, and forming a glass body or form from a melt;

Heat treating the glass body at a temperature above the glass strain point to generate halide crystals having a size in the range of 500-2000 Angstroms (Å);

Elongating the halide crystal-containing glass body under stress at a temperature above the glass annealing point to elongate and orient the crystals; and Exposing the elongated body to a reducing atmosphere at a temperature in the range of 250° C. to 500° C. develop a reduced surface layer on the body that contains metal particles with an aspect ratio of at least 2:1.

Photorefractive glasses are those in which an index of refraction changes can be induced in the glass material by exposing it to light followed by a thermal treatment. In the compositions of the present invention the light required to induce the refractive index change is in the ultraviolet range. As has been described in U.S. Pat. No. 4,979,975, a photorefractive glass was prepared by melting a batch of glass consisting of the oxides of silica, zinc, aluminum, cerium, boron, antimony and sodium and additionally silver, fluorine and bromine. The melt was cooled to a temperature below the transformation range of the glass and simultaneously formed into a glass body of a desired geometry. At least a portion of the glass was then exposed to ultraviolet radiation having a wavelength in the range of 300-355 nm and then heated to a temperature below the softening point of the glass to allow the NaF phase to develop. Finally the glass was cooled to room temperature. While this glass was photorefractive, it was not both photorefractive and polarizing due to the presence of fluorine and cerium as further explained below.

While polarizing glasses and photorefractive glasses are known in the art, there is no known glass that is both polarizing and photorefractive.

The present invention is directed to a polarizing, photorefractive glass having a composition consisting essentially of, in weight percent ("wt. %"), 70-73% $SiO_2$, 13-17% $B_2O_3$, 8-10% $Na_2O$, 2-4% $Al_2O_3$, 0.005-0.1% CuO, <0.4% Cl, 0.1-

0.5% Ag, 0.1-0.3% Br, and further to a polarizing, photorefractive article or element made from the glass composition. In another embodiment the glass with a composition consists essentially of, in weight percent ("wt. %"), 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, 0.1-0.3% Br. In preparing the glass composition described herein, except for the metals Cu and Ag, oxides, metal carbonates, nitrates, hydroxides and hydrates thereof, or mixtures of any of the foregoing, are used in preparing the glass compositions. While Cu and Ag can be added as oxides, metal carbonates, hydroxides and hydrates, it is preferred that they be added as halides (Br, Cl only), nitrates, nitrites or other compounds known in the art to be useful for making polarizing glasses. Fluoride is not included among the halogens because its use results in glass compositions that are not both polarizing and photorefractive. Elements whose presence interferes with a glass being both polarizing and photorefractive or result in a colored glass are excluded. Additionally the glasses of the invention do not contain cerium. Other elements may be present at contamination levels; for example without limitation, lithium, iron and potassium.

In an addition embodiment the polarizing, photorefractive glass has composition consisting essentially of, in weight percent, 71.1±0.5% $SiO_2$, 14.7±0.5% $B_2O_3$, 9.3±0.5% $Na_2O$, 3±0.5% $Al_2O_3$, 0.005-0.1% CuO, <0.4% Cl, 0.33±0.05% Ag, 0.1-0.3 Br %, and further to an article or element made from the glass composition. Additional compositions are glasses consisting essentially of, in weight percent, 71±1% $SiO_2$, 15.5-17.5% $B_2O_3$, 7-9% $Na_2O$, 3±0.5% $Al_2O_3$, 0.01±0.005% CuO, <0.4% Cl, 0.33±0.05% Ag and 0.1-0.3% Br; and 71.7±0.5% $SiO_2$, 15.8-17.2% $B_2O_3$, 7.2-8.5% $Na_2O$, 3±0.5% $Al_2O_3$, 0.01±0.005% CuO, <0.4% Cl, 0.33±0.05% Ag, and 0.1-0.3% Br.

Fluoride is not included among the halogens because its use results in glass compositions that are not both polarizing and photorefractive. Additionally the glasses of the invention do not contain cerium. Other elements may be present at contamination levels; for example without limitation, lithium, iron and potassium.

In an additional embodiment the invention is directed to a silver halide containing glass with a composition consisting essentially of, in weight percent ("wt. %"), 70-73% $SiO_2$, 13-18% $B_2O_3$, 7-9% $Na_2O$, 2-4% $Al_2O_3$, 0.005-0.1% CuO, <0.4% Cl, 0.1-0.5% Ag, >0-<0.3% alkaline earth metal oxide, and 0.1-0.3% Br, and further to an article or element made from the glass composition.

In another embodiment the invention is directed to a silver halide containing glass with a composition consisting essentially of, in weight percent ("wt. %"), 71±1% $SiO_2$, 15.5-17.5% $B_2O_3$, 7-9% $Na_2O$, 3±0.5% $Al_2O_3$, 0.01±0.005% CuO, <0.4% Cl, 0.33±0.05% Ag, >0-<0.3% CaO, and 0.1-0.3% Br, and further to an article or element made from the glass composition.

In another embodiment the glass composition is, in weight percent ("wt. %"), 71.7±0.5% $SiO_2$, 15.8-17.2% $B_2O_3$, 7.2-8.5% $Na_2O$, 3±0.5% $Al_2O_3$, 0.01±0.005% CuO, <0.4% Cl, 0.33±0.05% Ag, >0-<0.3% CaO (or other alkaline earth metal oxide such as MgO, BaO and SrO), and 0.1-0.3% Br.

In all embodiments of the invention the compositions have an "R value" in the range of 0.3-0.65, preferably in the range of 0.35 to 0.60. All embodiments of the invention the compositions contain at least one halogen selected from the group consisting of chlorine and bromine.

In another embodiment the invention is directed to glass articles that are both photorefractive and polarizing in the same piece of glass. A glass of this type was used to make an article or element that is a fully integrated light polarizer and diffractive element. Examples of the type of articles that can be made using the glass of the invention include, without limitation, Bragg grating, filtering articles, and beam shaping and light collection articles for use in display, security, defense, metrology, imaging and communications applications.

By way of an example, without limitation, a glass composition and an article of the invention was made by mixing together an oxide, carbonate, hydroxide and/or hydrate (or mixtures thereof) of silicon, boron, aluminum and sodium, ball milling the mixture, adding the silver and copper in the form of a nitrate solution, and adding the chloride and bromide in solution form. After all the materials have been thoroughly mixed, the mixture is then placed in an appropriate vessel (for example, a platinum crucible), melted, and then cast or extruded into a form suitable for redrawing (for example, a bar).

Using a bar as an example, the bar was heated to a temperature in the range of 575-750° C. (the first heat treatment) for a time in the range of 1-6 hours to develop the AgX (X=Cl and/or Br) phase in the glass. In another embodiment the heating time is in the range of 1-4 hours. The heat-treated glass bar was then redrawn under conditions where the draw temperature allows a glass viscosity greater than $10^6$ poise and a pulling velocity that is sufficient to apply a force greater than 3500 psi (>3500 psi) to elongate the AgX phase to have an aspect ratio of at least 2:1 and preferably at least 5:1. Thermal treatments are generally carried out at a temperature near (within 25-50° C.) the softening point of the glass composition.

At this point in the process the glass had no color, the material was transparent and the AgX crystals in the glass have been stretched. Stretching is evidenced by a strong birefringence pattern of the glass which was found for glasses having the compositions recited herein. Once the redraw has been completed the glass can be cut, sawed or otherwise made into an article or element (sample) of dimensions suitable for the intended use.

Following the redraw and sample piece preparation, a "photorefractive exposure" was carried out on the sample using UV radiation in the range of 190-360 nm (for example, using a laser operating at 193, 248, 266 or 355 nm). Glass samples were exposed to UV radiation using a 248 nm, 10 Hz laser operating at approximately 1 W/mm² for a time in the range of 1-10 minutes or a 355 nm, 10 Hz laser operating at 1-2 W/mm² for a time in the range of 1-7 hours. The exposure can be done on all or part of the glass sample depending on the intended end use. For example, if the sample is intended to be made into a diffraction grating such as a Bragg grating only selected portions of the glass are exposed to the UV radiation. The "photorefractive exposure" was done using a photomask (also called a phase mask). The mask can be applied to the entire glass sample or to any portion of of the sample. Hence, one can produce a sample in which the photorefractive effect is throughout the entire sample or a selected portion of the sample.

Phase masks are commercially available; for example, from Ibsen Photonics (Farum, Denmark), StockerYale (Salem, N.H.), and O/E Land, Inc. (Saint-Laurent, Quebec, Canada). Following the photorefractive exposure step the sample had no color, and the AgX crystals were elongated and had not respheroided. FIG. 1 illustrates the refractive index change ("Delta n") as a function of time that occurs in the glasses of the invention after exposure to UV radiation from an Nd:YAg laser that operates at 633 nm and heat treatment as described above.

Subsequent to the "photorefractive exposure," the sample was then subjected to a second heat treatment to develop the photorefractive effect. A second heat treatment was carried out at a temperature in the range of 400-500° C. for a time in the range of 1-4 hours. In one embodiment the second heat treatment was carried out at a temperature in the range of 450-500° C. for a time in the range of 1-4 hours. It is important that this second heat treatment be carried out at a temperature of 500° C. or less in order to prevent the elongated AgX particles from respheroidizing.

Subsequent to the second heat treatment the sample was reduced in a $H_2$ atmosphere at a temperature in the range of 390-450° C. for a time in the range of 1-6 hours. In one embodiment, subsequent to the second heat treatment the sample was reduced in a $H_2$ atmosphere at a temperature in the range of 390-430° C. for a time in the range of 1-6 hours. Preferably the reduction time was in the range of 2-4 hours. The $H_2$ treatment can be extended for a longer time and/or carried out under pressure to control the depth of the $H_2$ reduction of the elongated AgX particles. Controlling the temperature is used to control the contrast ratio of the polarizer. A 2-4 hour heat treatment at 390-430° C. and a $H_2$ pressure of 1-5 atmospheres, preferably 1-2 atmospheres, produces surface polarizing layers, illustrated in FIG. 5D by numeral 28, having a thickness of 40 μm or less, typically in the range of 20-40 μm. Hydrogen reducing at a pressure of greater than 10 atmospheres can produce a polarizer having a polarizing layer thickness of greater than 50 μm. After reduction the sample is both photorefractive and polarizing.

The formation of silver halide crystals during the first heat treatment is critical to producing a glass that is both photorefractive and polarizing. This is preferably done at a temperature in the range of 575-725° C. for a time in the range 1-4 hours. Without the presence of silver halide crystals in the glass there can be no dichroic or photorefractive effect (but the silver halide particles must be larger in size to produce the dichroic effect). Hence, in the final product the photorefractive effect is throughout the entire sample (article or element) or a selected portion of the sample depending on where the mask was applied, except for the thin polarizing surface layers in which the silver halide particles were reduced to form silver particles which produce the polarizing effect. The final product is an integrated article or element that is thus both photorefractive and polarizing.

Figure 3:
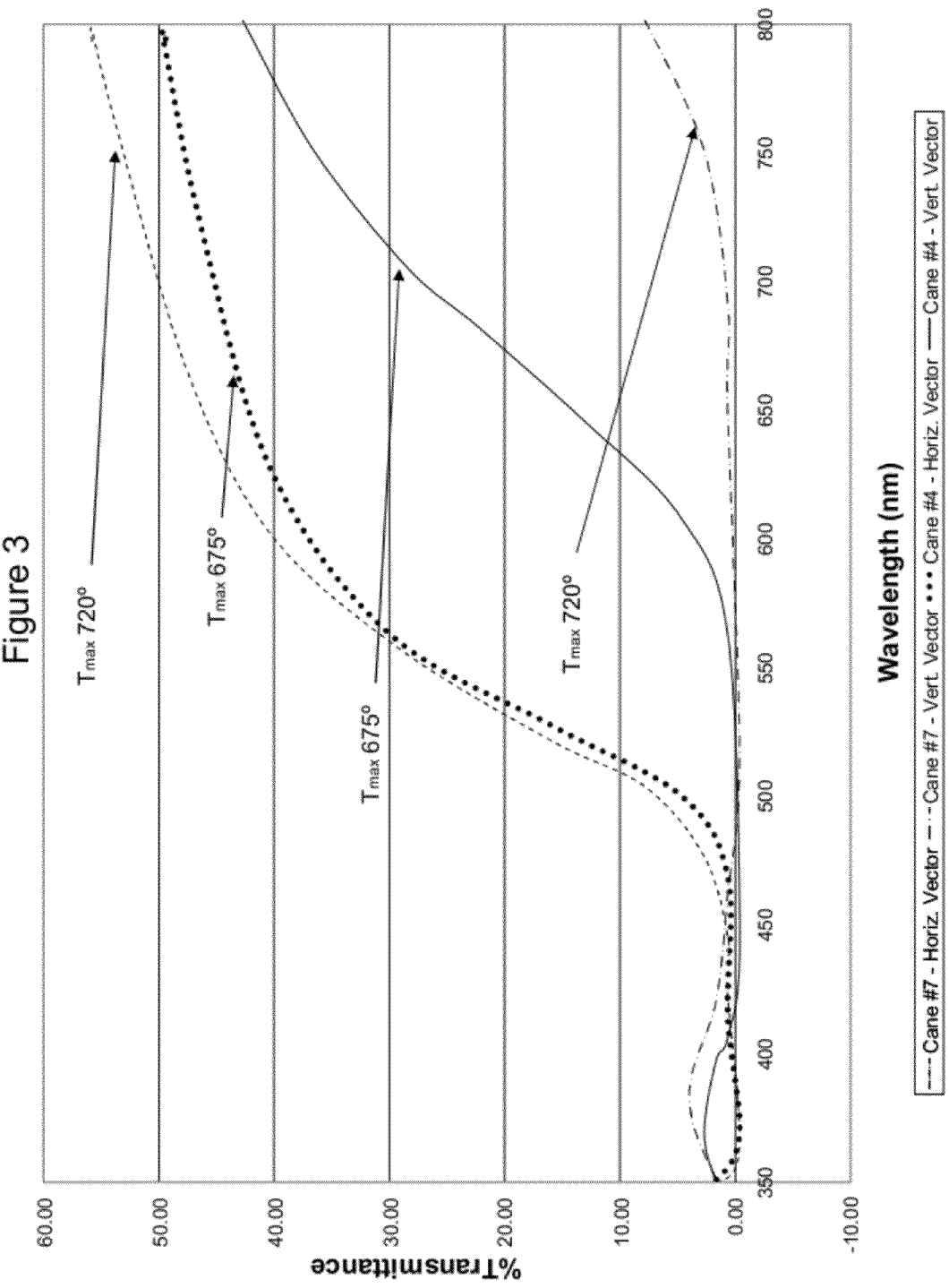
FIG. 3 illustrates the polarized transmission of sample of a glass of the invention after heat treatment at different temperatures followed by redraw.

The polarized transmission spectrum of a glass according to the invention is illustrated in FIG. 3. Two samples of glass were prepared. One sample was given a first heat treatment at 720° C. and a second sample was given a first heat treatment at 675° C. The sample were then redrawn, reduced in a hydrogen atmosphere at a temperature in the range of 390-430° C. for a time in the range of 2-4 hours. The polarized transmission spectrum was then measured and is as shown in FIG. 3 which clearly indicates that both glass samples are polarizing.

In addition to measuring the polarized transmission spectrum of the glasses of the invention, the "R value" ["R"] of representative samples was determined. The R value is defined as the molar ratio of network modifiers ("M") minus alumina ("A") to boric oxide ("B"); that is:

$$R=(M-A)\div B$$

The polarizing, photorefractive glass of the invention have an R value in the range of 0.3-0.65. In preferred embodiments the R value is in the range of 0.35 to 0.60. Glasses having an R value within the foregoing ranges are clear and both polarizing and photorefractive, whereas those having an R value outside the ranges are either colored or if clear are not both polarizing and photorefractive. For the purpose of calculating R value, modifiers are considered to be mostly singly and doubly ionized (e.g., +1 and +2) elements. The network modifiers are mostly the oxides of alkali and alkaline earth elements present in the composition. Elements such as Sn, As and Sb, which can be in either the +2 or +4 state, can also act as modifiers provided that they do not color the glass. Network modifiers do not include silica, halides, or transition metals except when the transition metals are at such levels that they do not color the glass (for example, copper and silver). Thus, in addition to the alkali and alkaline earth elements, network modifiers can include Ag and transition metals such as Cu, Co, Mn, V, Cr, Ni, Fe, etc., provided that the amount of such metals, if they color glass, is kept to a level such that they do not color the glass. Boron ("B"), phosphorus ("P"), germanium ("Ge") and silicon are network forming elements, and B, P and Ge can be substituted for Si to some extent, provided that the R value stays within the specified limits. Lastly, other elements can be considered to be "intermediates." Al, Pb, Zn, Zr and Ti can act as either network formers or network modifiers depending on their relative concentration. Pb, Zn, Zr and Ti are generally modifiers when in low concentrations (below 1 wt. %). Regarding Al, as long as the total of the alkali and alkaline earth metals exceed Al (that is, R>0), Al acts as a network former.

Figure 4:
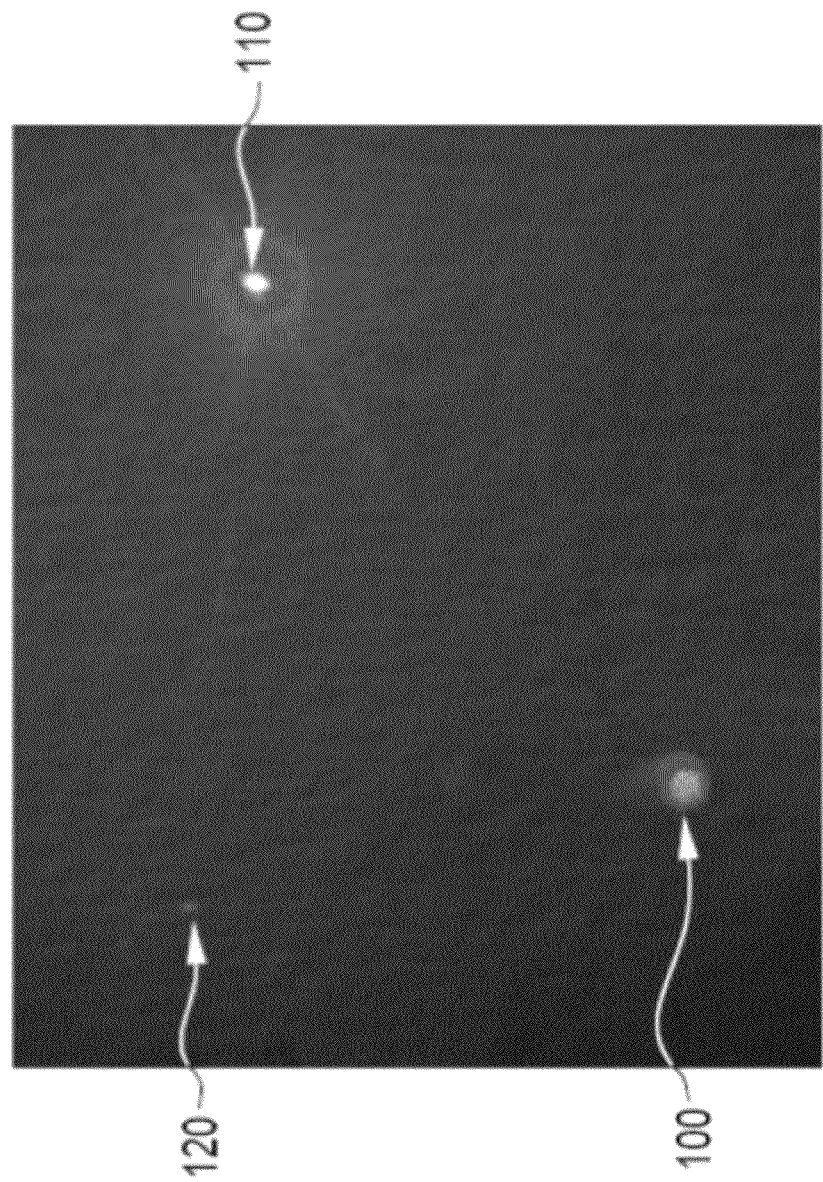
FIG. 4 illustrates the diffraction of a grating formed on a glass of the invention.

FIG. 4, a gray-scale reproduction of a color photograph, illustrates the diffraction of a grating formed on a glass of the invention. A sample of the same 720° C. heat treated glass used for FIG. 3, after undergoing redraw, was given a photorefractive exposure using a 355 nm laser, 10 Hz, 1-2 W/mm$^2$ for 7 hours. After completing the photorefractive exposure the glass was given a second heat treatment at 450° C. to develop the photorefractive exposure. Subsequently, the sample was reduced in a hydrogen atmosphere at 450° C. and the diffraction effect was determined and is shown in FIG. 4. The induced refractive index (Delta n as shown in FIG. 1) gave a value of 1-2×10$^{-5}$. In FIG. 4 the incident laser beam is labeled 100, the 0$^{th}$ order beam is labeled 110 and the 1$^{st}$ order diffracted beam is labeled 120. The 1st order diffracted beam is faint and difficult to see in the gray-scale reproduction (though not in a color photograph). Consequently, in order to make it more visible in FIG. 4 it is represented by, and is within, the circled area.

FIGS. 5A-5D illustrates a glass article as it proceeds through the steps enumerated above. FIG. 5A illustrates the glass article or element 20 with AgX crystals 22 developed after the first heat treatment at 575-625° C. FIG. 5B illustrates the glass article 20 with elongated AgX particles 24 after redraw. FIG. 5C illustrates the glass article 20 after redraw and with a pattern after "photorefractive exposure", the pattern being represented by heavy black lines 26. AgX particles are not illustrated in FIG. 5C. FIG. 5D illustrates the glass article 20 with a pattern after "photorefractive exposure" represented by lines 26, and with polarizing layers 28 (hatched area) after $H_2$ treatment. The pattern lines 26 extend within polarized layers (area) 28. AgX particles in the non-polarizing layer are not represented in FIG. 5D and Ag$^0$ particles are represented by the hatched lines of layer 28. Without being held to any theory, the photorefractive effect involves AgX in a manner that is not clearly understood at this time.

The invention is also directed to an optical element or article that is both photorefractive and polarizing made from a silver halide containing glass composition as described herein. A refractive index pattern is formed in the silver halide-containing glass material, the refractive index pattern including regions of high refractive index and regions of low refractive index. The optical element also has at least one polarizing layer.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

We claim:

1. A photorefractive, polarizing glass composition consisting essentially of, in weight percent, 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, and 0.1-0.3% Br,
wherein said composition being suitable for making an article or element that is both polarizing and photorefractive.

2. The photorefractive, polarizing glass composition according to claim 1, wherein said glass has an R value in the range of 0.3-0.65.

3. The photorefractive, polarizing glass composition according to claim 1, wherein said glass has an R value in the range of 0.35-0.60.

4. The photorefractive, polarizing glass composition according to claim 1, wherein said composition consists essentially of, in weight percent, 71.1±0.5% $SiO_2$, 14.7±0.5% $B_2O_3$, 9.3±0.5% $Na_2O$, 3±0.5% $Al_2O_3$, 0.005-0.1% CuO, <0.4% Cl, 0.33±0.05% Ag, and <0.3% B; and
said glass has an R value in the range of 0.35-0.60.

5. The photorefractive, polarizing glass composition according to claim 1, wherein said composition consists essentially of, in weight percent, 71±1% $SiO_2$, 15.5-17.5% $B_2O_3$, 7-9% $Na_2O$, 3±0.5% $Al_2O_3$, 0.01±0.005% CuO, <0.4% Cl, 0.33±0.05% Ag and 0.1-0.3% Br; and
said glass has an R value in the range of 0.35-0.60.

6. The photorefractive, polarizing glass composition according to claim 1, wherein said composition consists essentially of, in weight percent, 71.7±0.5% $SiO_2$, 15.8-17.2% $B_2O_3$, 7.2-8.5% $Na_2O$, 3±0.5% $Al_2O_3$, 0.01±0.005% CuO, <0.4% Cl, 0.33±0.05% Ag, and 0.1-0.3% Br; and
said glass has an R value in the range of 0.35-0.60.

7. A polarizing, photorefractive glass composition consisting essentially of, in weight percent, 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, >0-<0.3% alkaline earth metal oxide, and 0.1-0.3% Br, said composition being suitable for making an article or element that is both polarizing and photorefractive; and
wherein said composition has an R value in the range of 0.3-0.65.

8. The polarizing, photorefractive glass composition according to claim 7, wherein said composition is, in weight percent, 71±1% $SiO_2$, 15.5-17.5% $B_2O_3$, 7-9% $Na_2O$, 3±0.5% $Al_2O_3$, 0.01±0.005% CuO, <0.4% Cl, 0.33±0.05% Ag, >0-<0.3% CaO and 0.1-0.3% Br, wherein said composition has an R value in the range of 0.35-0.6.

9. The polarizing, photorefractive glass composition according to claim 7, wherein said composition is, in weight percent, 71.7±0.5% $SiO_2$, 15.8-17.2% $B_2O_3$, 7.2-8.5% $Na_2O$, 3±0.5% $Al_2O_3$, 0.01±0.005% CuO, <0.4% Cl, 0.33±0.05% Ag, >0-<0.3% CaO and 0.1-0.3% Br;
wherein said composition has an R value in the range of 0.35-0.6.

10. An optical element comprising:
an element made of a silver halide containing glass composition; and
a refractive index pattern formed in the silver halide-containing glass composition, the refractive index pattern including regions of high refractive index and regions of low refractive index;
surface polarizing layers; and
said optical element is both photorefractive and polarizing.

11. The optical element according to claim 10, wherein said silver halide containing glass is a glass consisting essentially of, in weight percent, 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, and 0.1-0.3% Br;
wherein said glass has an R value in the range of 0.3-0.6.

12. The optical element according to claim 10, wherein said silver containing glass is a glass consisting essentially of, in weight percent, 71.1±0.5% $SiO_2$, 14.7±0.5% $B_2O_3$, 9.3±0.5% $Na_2O$, 3±0.5% $Al_2O_3$, 0.005-0.1% CuO, <0.4% Cl, 0.33±0.05% Ag, and 0.1-0.3% Br;
wherein said glass has an R Value in the range of 0.3-0.65.

13. The optical element according to claim 10, wherein said silver containing glass consists essentially of, in weight percent, 70-73% $SiO_2$, 13-18% $B_2O_3$, 7-10% $Na_2O$, 2-4% $Al_2O_3$, 0.005-0.1% CuO, <0.4% Cl, 0.1-0.5% Ag, >0-<0.3% alkaline earth metal oxide and 0.1-0.3% Br.

14. The composition according to claim 10, wherein said silver containing glass is a glass consisting essentially of, in weight percent, 71±1% $SiO_2$, 15.5-17.5% $B_2O_3$, 7-9% $Na_2O$, 3±0.5% $Al_2O_3$, 0.01±0.005% CuO, <0.4% Cl, 0.33±0.05% Ag, >0-<0.3% CaO and 0.1-0.3% Br.

15. The composition according to claim 10, wherein said silver containing glass is a glass consisting essentially of, in weight percent, 71.7±0.5% $SiO_2$, 15.8-17.2% $B_2O_3$, 7.2-8.5% $Na_2O$, 3±0.5% $Al_2O_3$, 0.01±0.005% CuO, <0.4% Cl, 0.33±0.05% Ag, >0-<0.3% CaO and 0.1-0.3% Br.

16. The optical element according to claim 10, wherein said element is selected from the group consisting of Bragg gratings, filtering elements, beam shaping elements and light collection elements.

* * * * *